United States Patent [19]

Reville

[11] 3,885,414

[45] May 27, 1975

[54] PACKAGE FOR CALIBRATION FLUIDS AND PROCESS

[75] Inventor: John J. Reville, Scotia, N.Y.

[73] Assignee: General Electric Company, Milwaukee, Wis.

[22] Filed: Oct. 24, 1972

[21] Appl. No.: 299,844

[52] U.S. Cl. .................................................. 73/1 R
[51] Int. Cl. ............................................ G01c 25/00
[58] Field of Search ............... 73/1 R, 1 A, 422 GC; 23/259

[56] References Cited
UNITED STATES PATENTS 3,247,702   4/1966   Houser et al. ................. 73/1 R;23.1
3,618,363   11/1971  Kraus .................................. 73/1 R Primary Examiner—Donald O. Woodiel
Attorney, Agent, or Firm—Thomas J. Bird, Esq.; George B. Finnegan, Jr.; Rocco S. Barrese

[57] ABSTRACT

A sealed package for calibrating a testing instrument with a fluid calibrated at a preselected temperature, the fluid being normally subject to permanent, unpredictable interaction with its surrounding environment due to permeation, diffusion and chemical reaction during the packaging process, shelf storage, the dispensing process or the use cycle, the package comprising rigid, hollow vessel of nonpermeable material, at least one end of the vessel terminating in a sealed port and a calibration fluid partially or completely filling the vessel and having the above-enumerated characteristics. Means for filling and sealing the packages and for calibrating instruments, e.g., blood gas analyzers, with them are also disclosed.

10 Claims, 7 Drawing Figures

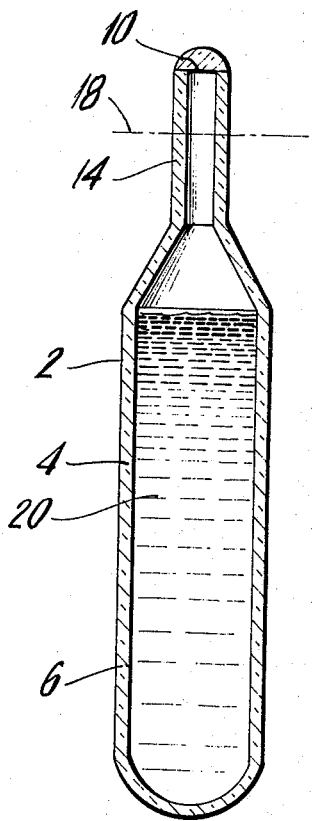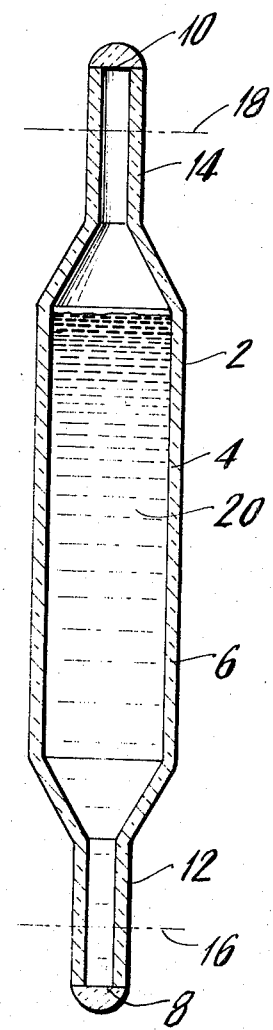
FIG. 1
FIG. 2

PATENTED MAY 27 1975

3,885,414

SHEET 2

PACKAGE FOR CALIBRATION FLUIDS AND PROCESS

The present invention relates to the packaging of fluids to calibrate testing instruments. More particularly, it is concerned with providing sealed packages of liquid buffer solutions with predetermined dissolved gas contents for calibrating pH and gas analyzers and the like.

BACKGROUND OF THE INVENTION

A number of instruments have been developed commercially to directly measure the hydrogen ion content (pH), partial pressure of carbon dioxide ($P_{CO_2}$) and the partial pressure of oxygen ($P_{O_2}$) of in vitro macro and micro samples of blood, respiratory gases and other physiological fluids. Such measurements provide valuable information to physicians in the diagnosis and treatment of cardio-pulmonary diseases and aid in surgery, pulmonary function studies, cardiac catheterization, anesthesia studies, and the like.

Most commercial instruments determine the pH, $P_{CO_2}$ and $P_{O_2}$ via various electrochemical sensing mechanisms. For example, it is customary to determine pH and $P_{CO_2}$ with a glass electrode assembly and $P_{O_2}$ with an amperometrically functional electrode, e.g., one based on a platinum cathode and a silver-silver chloride anode. As with all such systems, to operate efficiently and reproducibly, frequent calibration is necessary. In most cases, calibration involves using various mixtures of liquid buffer solutions as well as separate compressed calibration gases which are housed in rather bulky, hard-to-handle, and potentially dangerous compressed gas tanks. The use of such tanks is not very attractive — usually the instrument must be mounted on a carrying cart together with the tanks — and this makes the actual analyzer quite restricted and somewhat too immobile for use outside the laboratory, e.g., in the ward or operating room of a hospital.

In Wilfore, U.S. Pat. No. 3,681,255, calibration fluids are provided which, when adequately packaged, will replace the bulky and dangerous compressed gas tanks and separate buffer solutions. In the Wilfore patent it is disclosed that aqueous bicarbonate solutions when equilibrated with given concentrations of carbon dioxide gases will exhibit a predeterminable pH behavior. By selection of bicarbonate concentration and suitable calibration gases, liquid calibration fluids can be prepared having given pH's and partial pressure of carbon dioxide and, optionally, of oxygen or other gases. To save detailed discussion, the disclosure in U.S. Pat. No. 3,681,255 is included herein by reference.

It is important to provide adequate packaging of such calibration fluids because they are normally subject to permanent, unpredictable interaction with their surrounding environment due to permeation, diffusion and chemical reaction during the packaging process, shelf storage, the dispensing process or the use cycle.

Thus, after such calibration fluids have been prepared they should be maintained at a pre-selected temperature in a system which prevents the diffusion of gas or vapor prior to use. Unless such a step is taken, the partial pressure value (or values) will drift and these also can cause the pH values to change and become unreliable. The method of packaging in such a system is obviously very important, therefore, to maximize reproducibility, reliability, accuracy and shelf-life.

Among the packaging systems advocated for preventing gas or vapor diffusion and capable of liquid delivery are self-collapsing bags and tubes. Packaging systems based on such concepts include:

1. a plastic bag, similar to a Fenwal blood bag, laminated with a plastic, such as polyvinylidene chloride (SARAN), which has a low gas permeability. The bag can be further laminated with a 0.001 in. aluminum foil and an external plastic layer. With sealed edges, the package is tough, strong, self-collapsing and has a long shelf-life;

2. a plastic bag of somewhat less complex construction than (1) is sealed in a metal can containing a gas composition identical to the concentration within the bag. Equilibrium will be maintained because the metal can allows no external diffusion to occur. The can is opened just before use;

3. a metal can containing an inflatable insert. The can is sealed and no liquid-gas interface and no gas or vapor diffusion takes place; and 4. a plastic lined metal tube, such as a tooth-paste-type tube, with a metal seal on one end and a heat-sealed pressed seal on the other end. This can be pressured externally to accomplish delivery.

The above-mentioned four packaging proposals are complicated and expensive to carry out in practice, mainly because of either the difficulty in creating a final seal which has a low permeation rate and/or the difficulty in preventing reaction of the packaging material with the container material. It has now been discovered that with proper attention to design and manipulative techniques, it is practical to use a noncollapsible container and provide a package which permits the preparation of calibration fluids well in advance of their use as instrument standardizing agents and maintain their integrity, e.g., desired partial pressure of carbon dioxide, oxygen and other gases in solution as well as pH values, until the fluids are used. Such packaging systems can also be employed according to this invention to dispense the fluids into the instrument to be calibrated in such a manner as to maintain the aforesaid integrity.

DESCRIPTION OF THE DRAWINGS

FIG. 1 is a view in vertical section of a sealed package according to this invention for calibrating a testing instrument, this embodiment having one sealed port;

FIG. 2, like FIG. 1, is a view in vertical section and illustrates a preferred embodiment of a sealed package according to this invention, this embodiment having two sealed ports;

DESCRIPTION OF THE INVENTION

Figure 3:
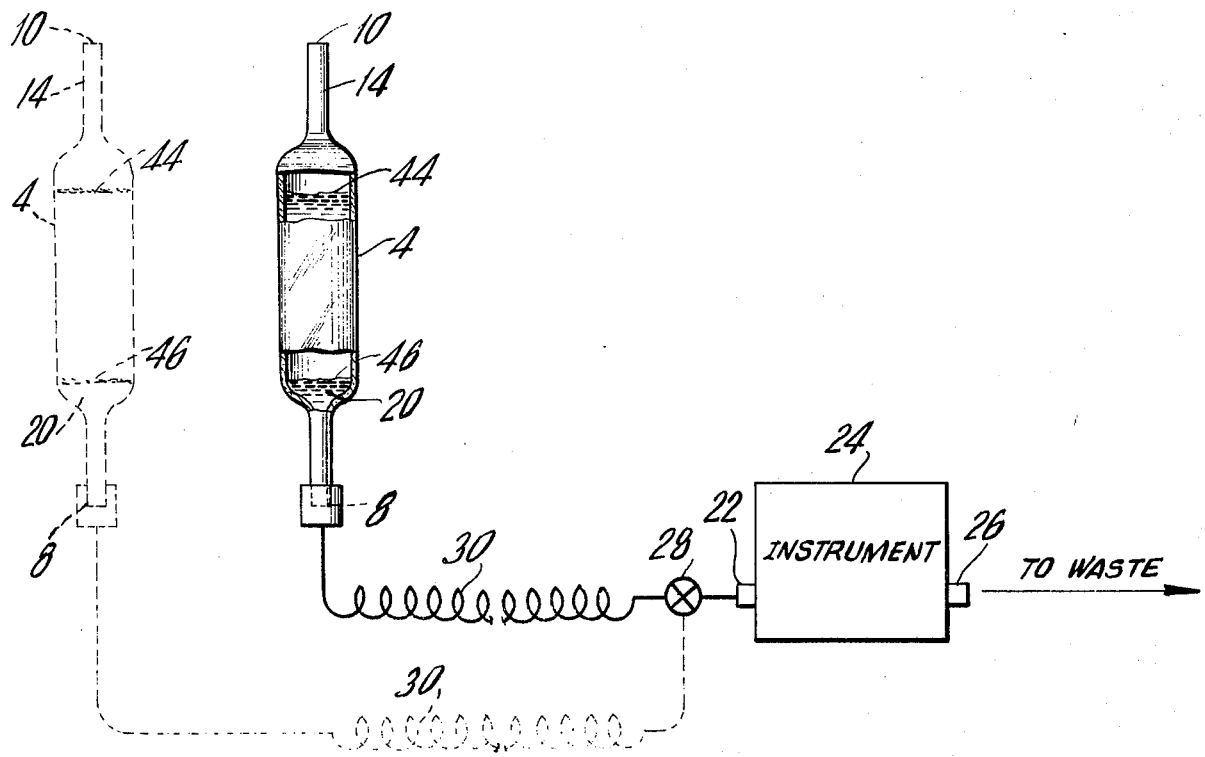
FIG. 3 illustrates in semi-schematic form an assembly for calibrating an instrument with the package of FIG. 2 according to the method of this invention and shows further a means for retarding back-diffusion of ambient gases allowing more time for use of the sensitive calibration fluid.

According to this invention there is provided a sealed package for calibrating a testing instrument with a fluid calibrated at a pre-selected temperature, the fluid being normally subject to permanent, unpredictable interaction with its surrounding environment due to permeation, diffusion and chemical reaction during the packaging process, shelf storage, the dispensing process or the use cycle, the package comprising a rigid hollow vessel of non-permeable material, at least one end of the vessel terminating in a sealed port and a calibration fluid partially or completely filling the vessel and having the characteristics recited hereinabove. In preferred embodiments, the vessel will terminate at its lower end in a first sealed port and at its upper end in a second sealed port.

The calibration fluid can be selected from those conventionally employed for instruments of the type above-mentioned, and, in general, will be a fluid medium containing solutes and gases to yield the predetermined calibrating points at the pre-selected temperature, e.g., from −10°C. to 100°C., typically from 20°C. to 60°C. and, in blood-gas analyzers, at temperatures mimicking body temperature, e.g., 37°C. Illustratively, the calibration fluid will be one for use with a blood gas analyzer, and it will comprise an aqueous medium, a water soluble pH adjustor, e.g., a bicarbonate salt, and a carbon dioxide containing gas and, optionally, an oxygen containing gas. The material for constructing the rigid hollow vessel can comprise opaque or transparent metal, plastic, glass, and the like, it only being necessary to insure that material is non-permeable to gases and liquids and inert and non-reactive with the fluid and the components therein. The preferred material of construction is glass, which combines economy, transparency, rigidity, inertness and a self-fusing quality which facilitates closing the port or ports used for filling, venting, dispensing, etc.

The vessel may be either completely filled at the pre-selected temperature with the calibration fluid or partially filled with the fluid under a gas phase of the gaseous component of the calibration fluid or, in selected instances, with an inert gas, i.e., one which does not affect pH, e.g., nitrogen or argon.

According to another aspect of the invention there is provided a process for calibrating a testing instrument with a calibration fluid which is normally subject to permanent, unpredictable interaction with its surrounding environment due to permeation, diffusion and chemical reaction during the packaging process, self storage, the dispensing process or the use cycle, said process comprising:

a. providing a sealed package maintained at the pre-selected temperature, the package comprising a rigid hollow vessel of non-permeable material, at least one end of the vessel terminating in a seal port and a calibration fluid partially or completely filling the vessel and having the characteristics recited hereinabove;

b. opening the sealed port and affixing the opened port to the instrument to be calibrated, e.g., either directly to an entrance port or through a suitable conduit; and c. dispensing the calibration fluid into the instrument to effect the calibration process, it being understood that the rate of dispensing should be rapid enough to substantially preclude deviation in the temperature of the package from the pre-selected temperature. The dispensing step will also be carried out rapidly enough to prevent any consequential change of the fluids due to escape of dissolved gases.

If calibration is carried out on a "one-shot" basis with the requisite amount of fluid, there is a relatively short connection and dispensing time and not sufficient time for back-diffusion of ambient gases, e.g., $CO_2$ and $O_2$ in air, from the instrument into the package to upset the predetermined values. However, if a large enough quantity of fluid is packaged to provide a plurality of calibrations, i.e., 3 to 10, or even more, then it is preferred to connect the package through means maintained at the pre-selected temperature, such means including a small cross-sectional area passageway in open communication with the package and the instrument, the passageway being of sufficient length to retard back-diffusion of the ambient gases. For example, a glass or metal capillary tube or a sandwich block maintained at the preselected temperature and having a grooved channel between bonded faces can be employed, and if coils or tortuous passageways are provided, the overall package dimensions of such back-diffusion-preventing devices can be materially lessened (See FIGS. 3, 3A and 3B).

Means to fill and seal the vessel with the calibration fluid are also features of this invention.

According to one process, filling and sealing are effected by a. providing a rigid, hollow vessel of non-permeable material maintained at the pre-selected temperature, at least one end of the vessel terminating in a port and purging the vessel with a gas which is a component of said calibration fluid, or a mixture of such gases;

b. admitting a calibration fluid having the characteristics recited hereinabove into said vessel through said port until said vessel is partially of completely filled with said calibration fluid and permitting the purging gas or gases to be displaced through an open port; and c. sealing the port or ports to provide the filled, sealed package. In a preferred embodiment (FIG. 4), the vessel terminates at its lower end in a first port and at its upper end a second port.

According to another process, filling and sealing are effected by a. providing a rigid, hollow vessel of non-permeable material maintained at the pre-selected temperature, at least one end of the vessel terminating at its upper end in a port and purging the vessel with a gas which is a component of said calibration fluid, or a mixture of such gases, by introduction of the gas or gases through a tube which is centrally disposed within the port and which extends to near the bottom of the vessel, the outer wall of the tube and the inner wall of the first port being strategically sized to form an open annulus therebetween through which gas or gases can be vented from the vessel;

b. admitting a calibration fluid having the characteristics recited hereinabove into the vessel through the tube until the vessel is partially or completely filled with the calibration fluid and permitting the purging gas or gases to be displaced through the open annulus; and c. withdrawing the tube from the vessel and sealing the port to provide the filled, sealed package.

DESCRIPTION OF THE PREFERRED EMBODIMENTS

In FIG. 1 is shown package 2 comprising hollow, rigid vessel 4, of glass, plastic, metal and the like, in the form of an elongated cylinder including a body part 6, and terminating at its upper end in sealed port 10. The seals can be a plastic, such as cured epoxy or, if the vessel is resinous or glass, can be a fused closure. The elongated upper stem 14 is shown with break line 18 to show where the sealed port is broken open for final use allowing calibration fluid 20 to be removed from the package. As will be explained hereinafter, the vessel is sealed after the filling with calibration fluid has been completed to provide one embodiment of the sealed package of this invention.

In FIG. 2 is illustrated another embodiment, which has two ports. Package 2 comprises hollow, rigid vessel 4, also of glass, plastic, metal and the like, including body part 6, sealed port 10, upper stem 14, break line 18 and calibration fluid 20. In addition, the embodiment of FIG. 2 includes a first sealed port 8 in the lower end, an elongated lower stem 12, and a lower break line 16.

The vessel and fluid will be maintained at the desired, preselected temperature during the filling, sealing and dispensing processes. During storage (after sealing) the package need not be maintained at the pre-selected temperature until it is to be used for the calibration process. The package is then equilibrated at the preselected temperature before use (opening of the vessel).

It should be understood that the outside diameters of the body and stems in vessel 4 may vary from each other and are not limited to the construction shown in FIGS. 1 and 2. Moreover, the inside diameter of the body need not be greater than the inside diameter of the stems as shown in FIGS. 1 and 2. Merely by way of illustration, typically the vessels will have a capacity of 3 to 20 milliliters and will be from about 2 to 4 inches long and from ⅜ to 1 ½ inches in outside diameter.

Figure 3A:
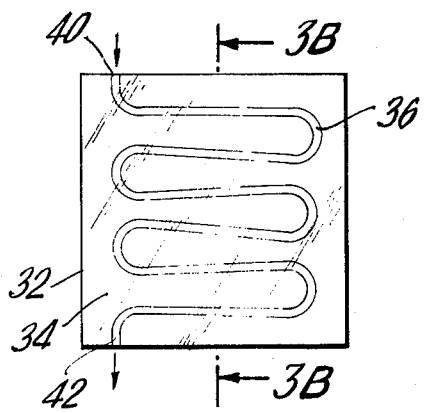
FIGS. 3A and 3B show an alternate means for retarding back-diffusion in the system of FIG. 3.
Figure 3B:
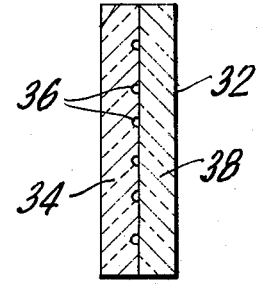

The use of a package of the FIG. 2 type is illustrated semischematically in FIG. 3. Vessel 4 at the preselected temperature is shown with first port 8 and second port 10 both opened, port 8 being used to dispense calibration fluid 20 into entrance port 22 on instrument 24 (shown schematically), including exit port 26 leading to a waste container (not shown). Shown in phantom is second vessel 4 connected to instrument 24 through multiport valve 28 which is optional but permits use of more than one package. Also shown in FIG. 3 is optional means to retard backdiffusion 30 which functions to retard back-diffusion of ambient gases after the first slug of fluid leaves exit port 26. If, for example, means 30 comprises a length of about 40 feet of 0.03 inch I.D. coiled glass capillary tubing, which contains about 5 ml. of fluid, the long length and small bore permits a comparatively long period of exposure to air through open end 10 of vessel 4 and exit port 26 without seriously affecting the integrity of the bulk of the fluid reposing in the long capillary which is maintained at the pre-selected temperature.

As an alternative to back-diffusion means 30, optional means 32 (shown in FIGS. 3A and 3B) can be provided. This comprises, for example, glass plate 34 including groove 36, such as an etched channel of capillary dimension, e.g., 0.03-inch diameter, bonded to plate 38, with fluid in port 40 and fluid out port 42 where shown.

The instrument is calibrated, for example, by opening first port 8 in vessel 4 and affixing it directly to entrance port 22 on instrument 24 or optionally to the end of intermediate means for retarding back-diffusion 30. Then second port 10 is opened and this permits entry into vessel 4 of an external medium, e.g., air, for displacing fluid 20 during the dispensing phase of the calibration process.

The fluid can comprise, for example, isotonic saline containing 1.9108 g./l. of sodium bicarbonate equilibrated at 37°C. and 758 mm.Hg. with a gas comprising 4.80% $CO_2$; 11.62% $O_2$; balance $N_2$, by weight. Such a fluid has a partial pressure of carbon dioxide, $P_{CO_2}$ of 34.1 mm.; a partial pressure of oxygen, $P_{O_2}$ of 82.6 mm. and a pH of 7.44.

The initial fluid level is shown at 44 and, after dispensing by gravity feed, aspiration or positive pressurization, it falls to, for example, level 46.

The calibration procedure is carried out after filling the instrument by adjusting the same by means well known to those skilled in the use of each particular analyzer. Only the central body of fluid (or that stored, e.g., in means 30 or 32) is used and diffusion is retarded enough to insure the integrity of that portion of the fluid actually used for calibration.

Figure 4:
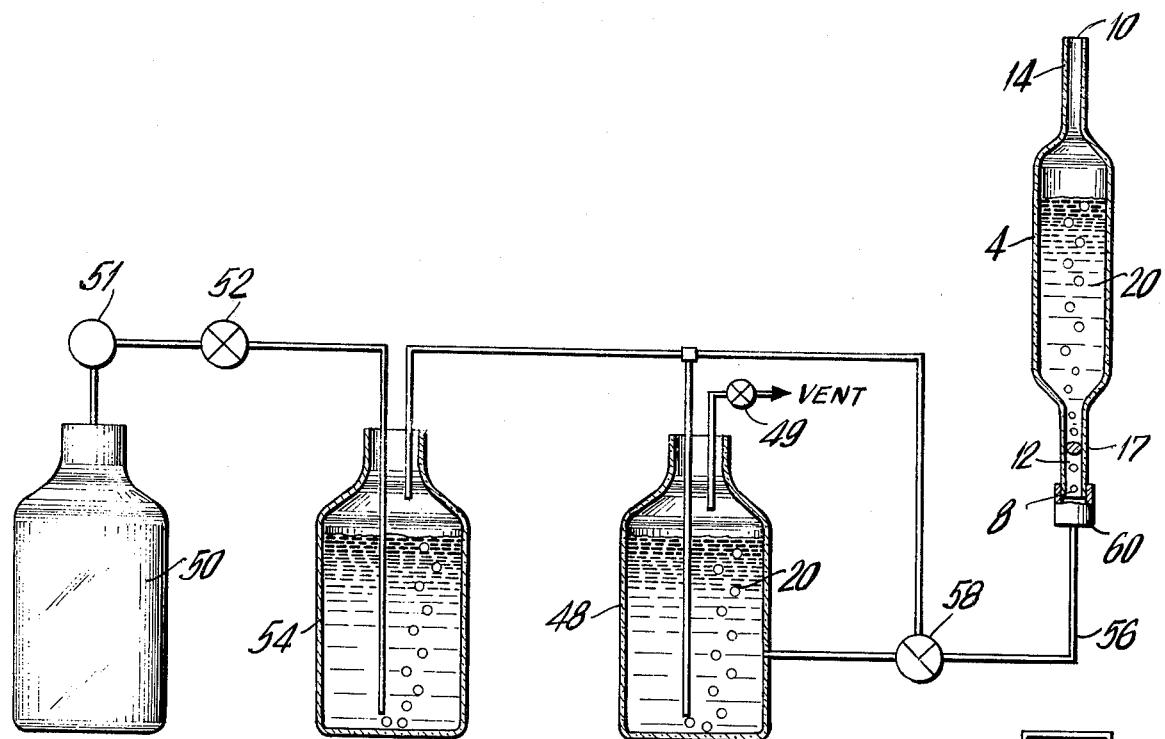
FIG. 4 shows in schematic form an assembly for filling and sealing the package of FIG. 2 according to one embodiment of this invention.

Referring to FIG. 4, there is shown one means to fill and seal a two-port vessel 4 with calibration fluid 20. A premixed bicarbonate solution, e.g., 1.521 g./l. of sodium bicarbonate in isotonic saline is pre-equilibrated in container 48 including vent 49 by bubbling the desired gas or mixture of gases, e.g., carbon dioxide, 10.02%, balance $N_2$ by weight which has been transferred from gas supply cylinder 50, through regulator 51, valve 42 and pre-humidifier 54, e.g., distilled water in a suitable container. First the gas purges vessel 4 which is maintained at the pre-selected temperature then solution 20 is admitted to vessel 4 into lower open stem 12 through a suitable conduit 56 the system including three-way valve 58 and pressure-tight fitting 60, e.g., a Touhy-Borst compression fitting. After filling vessel 4 to the desired level with fluid 20, three-way valve 58 can, if desired, be re-adjusted to bubble gas through the solution for final assurance of proper equilibration. Upper stem 14 of vessel 4 is then sealed at 10 with a suitable sealant, e.g., epoxy, or fusion sealed, if glass is used. The vessel optionally can be disconnected from fitting 60, inverted and stem 12 can be sealed at 8 in a similar manner. Alternatively, a stationary gas bubble can be produced in bottom stem 12 at 17 and a fusion seal can be produced here through the bubble instead of at 8 thus avoiding the need to invert the vial. If an epoxy or similar sealant is used, a barrier such as paraffin will be used to isolate the epoxy from the aqueous medium, and the environment of the desired gases will be maintained during the time required to cure the sealant.

Figure 5:
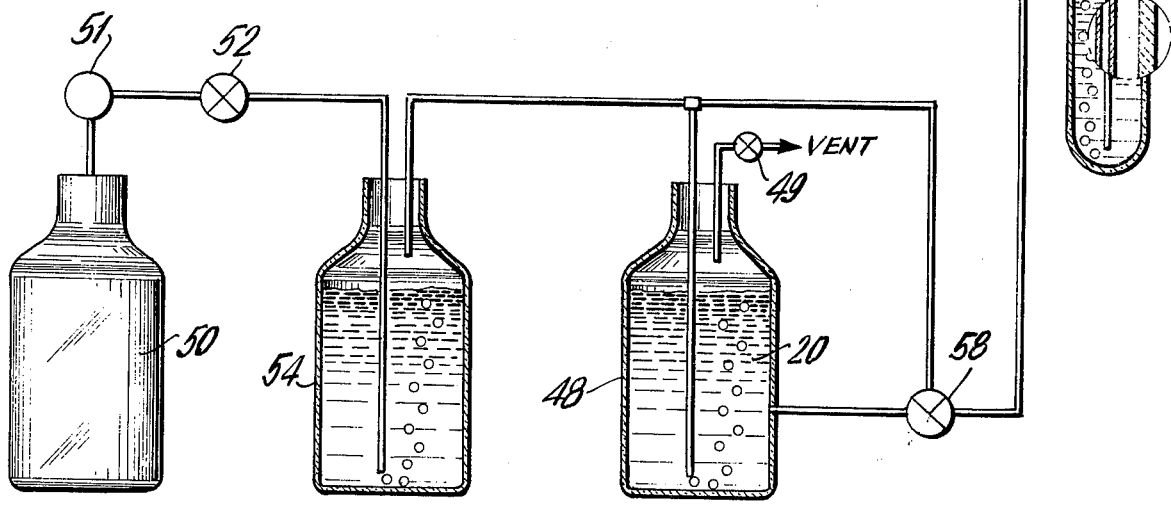
FIG. 5 shows in schematic form another assembly for filling and sealing the package of FIG. 1 according to another embodiment of this invention.

Referring to FIG. 5, there is shown a second means to fill and seal the single-port packages of this invention (although it can be used for multi-port vessels too after first sealing the bottom port). The general technique is substantially identical to that just described. Empty vessel 4 which is maintained at the pre-selected temperature is purged with humidified gas or gases by proper adjustment of 3-way valve 58, the gas being introduced below the surface of liquid 20 through slender tube 62, such as a long hypodermic type needle which extends to near the bottom of vessel 4 and has a small enough outside diameter to form annulus 64 between the tube and the inside wall of upper stem 14. During purging, the gas or gases exit through annulus 64. Then three-way valve 58 is reset and pre-equilibrated fluid 20 is admitted into vessel 4 through tube 62 until the desired level has been reached. If desired, a final gas purge can be carried out by readjusting valve 58. As a final step, tube 62 is withdrawn and the open port is immediately closed (i.e., 1 to 5 second lapse) by fusion sealing or with a suitable cement as described above. Both methods for filling and sealing the packages of this invention insure that the desired characteristics of the calibration fluid are retained up until the last moment before the final seal is made. Small changes which might be expected to occur during the final sealing process surprisingly have proved to be undetectable.

The package of FIG. 1 is adaptable to calibration by a number of techniques. For example, after opening at break line 18, an instrument fill needle can be inserted to the bottom of the liquid and filling can be done by aspiration. Alternatively, a probe can be inserted into the vessel and the liquid pressurized through the probe into the instrument to be calibrated. Likewise, the package of FIG. 2 is adaptable to dispensing into an instrument also by opening the lower port at 16 (leaving the upper port sealed) and aspirating the fluid into the instrument or, alternatively, opening the upper port at break line 18, inserting a probe to near the bottom of the fluid and aspirating the fluid through the probe into the instrument.

From the foregoing description and the accompanying drawings it is obvious that a useful package has been provided for calibrating testing instruments. Although the device and means to fill the same have been described with reference to fluids for calibrating blood gas analyzers, it is also intended that they be adapted for packaging other normally unstable fluids. Obvious modifications will suggest themselves to those skilled in the art.

The invention is not to be limited by the above description but is to be defined only by the appended claims.

I claim:

1. A process for calibrating a testing instrument with a fluid calibrated at a pre-selected temperature, said fluid being normally subject to permanent, unpredictable interaction with its surrounding environment due to permeation, diffusion and chemical reaction during the packaging process, shelf storage, the dispensing process or the use cycle, said process comprising:
   a. providing a sealed package maintained at the said pre-selected temperature, said package comprising a rigid hollow vessel of non-permeable material, at least one end of said vessel terminating in a sealed port and a calibration fluid partially or completely filling said vessel and having the characteristics recited hereinabove;
   b. opening said sealed port and affixing the opened port to the instrument being calibrated; and
   c. delivering said calibration fluid into the instrument to yield the pre-determined calibrating points at the pre-selected temperature, the rate of delivery of said calibration fluid being at least sufficient to preclude substantial deviation in the temperature of the vessel and the fluid from said pre-selected temperature.

2. A process for calibrating a testing instrument as defined in claim 1 wherein, in said package, said vessel terminates at its lower end in a first sealed port and at its upper end in a second sealed port and wherein the first sealed port is opened and affixed to an entrance port in the instrument being calibrated and including the step of opening the second sealed port and permitting entry into said vessel of an external medium for displacing said fluid during the delivery step of the calibration process and wherein the delivery step is carried out at a rate which is at least sufficient to preclude substantial interaction of the external medium with the central body of the calibration fluid.

3. A process for calibrating a testing instrument as defined in claim 1 wherein said instrument is a blood gas analyzer.

4. A process for calibrating a testing instrument as defined in claim 3 wherein said calibration fluid comprises an aqueous medium, a water soluble bicarbonate and a carbon dioxide containing gas.

5. A process for calibrating a testing instrument as defined in claim 4 wherein said calibration fluid also includes an oxygen containing gas.

6. A process for calibrating a testing instrument as defined in claim 1 wherein the non-permeable material of construction comprises glass.

7. A process for calibrating a testing instrument as defined in claim 6 wherein the port or ports are fusion sealed.

8. A process for calibrating a testing instrument as defined in claim 1 including the step of providing a means maintained at said pre-selected temperature, said means including a small cross-sectional area passageway in open communication with the package through the opened port and with an entrance port on the instrument to be calibrated, said passageway being of sufficient length to retard back-diffusion of ambient gases from the instrument into the package.

9. A process for calibrating a testing instrument as defined in claim 8 wherein the means including a small passageway comprises a coiled capillary tube.

10. A process for calibrating a testing instrument as defined in claim 8 wherein the means including a small passageway comprises a grooved channel between two bonded plates.

* * * * *

Dedication 3,885,414.—*John J. Reville*, Scotia, N.Y. PACKAGE FOR CALIBRATION FLUIDS AND PROCESS. Patent dated May 27, 1975. Dedication filed Oct. 14, 1980, by the assignee, *General Electric Company*.
Hereby dedicates to the Public the remaining term of said patent.
[*Official Gazette March 31, 1981.*]